March 19, 1968

T. BAEHNI 3,373,559

BALANCE STAFF ASSEMBLY

Original Filed Nov. 1, 1962

INVENTOR:
Thomas BAEHNI
by: J. Delattre-Seguy
Attorney

March 19, 1968     T. BAEHNI     3,373,559
BALANCE STAFF ASSEMBLY
Original Filed Nov. 1, 1962     2 Sheets-Sheet 2
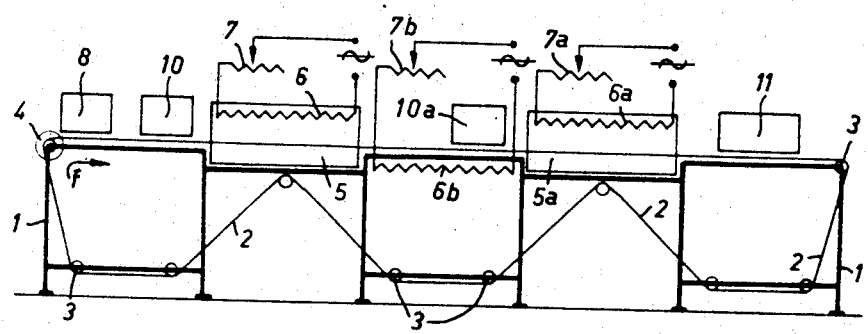
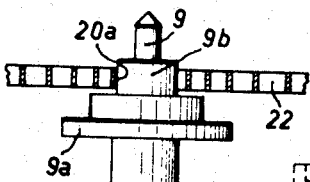
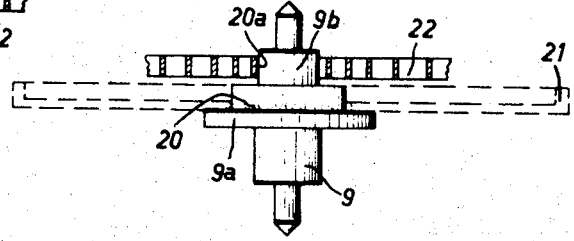
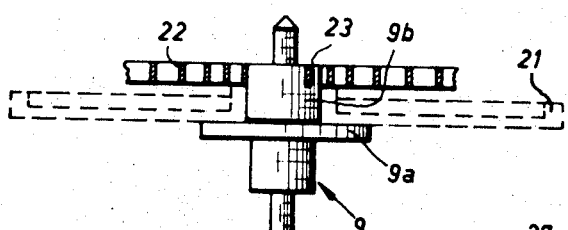
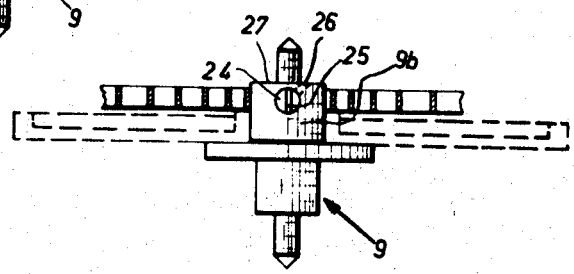
INVENTOR:
Thomas BAEHNI
by: J. Delatter Seguy
Attorney United States Patent Office 3,373,559
Patented Mar. 19, 1968

3,373,559
BALANCE STAFF ASSEMBLY
Thomas Baehni, Neuchatel, Switzerland, assignor to Baehni & Cie S.A., Bienne, Switzerland, a corporation of Switzerland
Original application Nov. 1, 1962, Ser. No. 234,624. Divided and this application Oct. 10, 1966, Ser. No. 621,368
1 Claim. (Cl. 58—115)

ABSTRACT OF THE DISCLOSURE

An assembly of a balance staff with at least one of the elements of a movement constituted by a balance wheel and a spiral hairspring, said balance staff having a radial slot and a collar spaced from the slot; the hairspring fitting in the slot and glued thereto; the balance wheel fitting around the staff and being glued thereto at a point intermediate the collar and the spring. The glue preferably is an epoxy-based resin.

---

This application is a division of my prior application Ser. No. 234,624 filed on Nov. 1, 1962, now abandoned.

In accord with the invention, means are provided for applying glue to the parts, to wit: the balance wheel and/or the heirspring to be fitted on the balance staff.

My invention will appear clearly from a reading of the following disclosure, reference being made to the accompanying drawings wherein:

FIG. 2 is a diagrammatic showing of a modified arrangement,

FIG. 7 shows a balance staff with a hairspring glued to it,

FIG. 8 shows a staff with both a balance wheel and a hairspring glued to it,

FIGS. 9 and 10 illustrate modifications in the manner of securing a hairspring to a balance staff.

Figure 1:
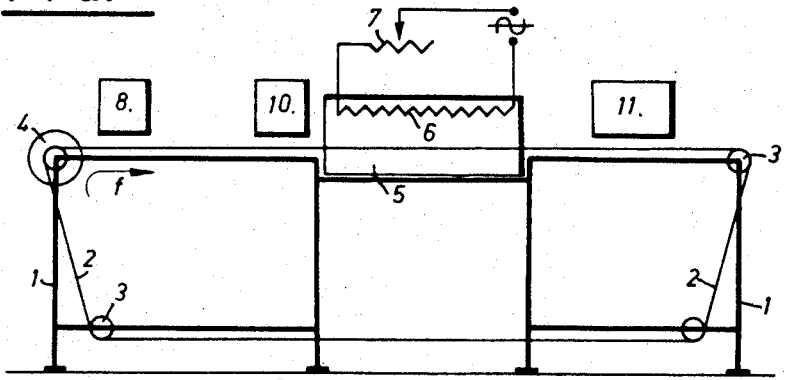
FIG. 1 is a diagrammatic showing of the arrangement.

The arrangement illustrated in FIG. 1 includes a frame 1 carrying a conveyor strip or belt 2 extending over tensioning rollers 3 and adapted to be set in motion by the motor 4 in the direction of the arrow $f$ through the agency of a driving roller: the conveyor strip passes through a tunnel-shaped kiln 5 heated by the electric resistances 6 and the temperature of which may be adjusted through the rheostat 7 which is inserted for instance in series with the heating resistances.

Along the upper section of the strip 2 are arranged the element-feeding systems 8 and 10 the operation of which will be disclosed hereinafter. After the strip 2 has passed through the kiln 5, it registers with an optic control arrangement 11 constituted by an outline projector.

The strip 2 carries a plurality of independent receiving systems 12 secured through means which are not illustrated. Each system contains a frame 12a and a securing member 12b and is fed with balance staffs 9 from the feeding system 8. Said member 12b is pivotally secured at 13 to the frame 12a so that it is possible to act for instance on a lever 14 to bring said member to a vertical position to receive said staffs or else to return it to a horizontal position.

Figure 3:
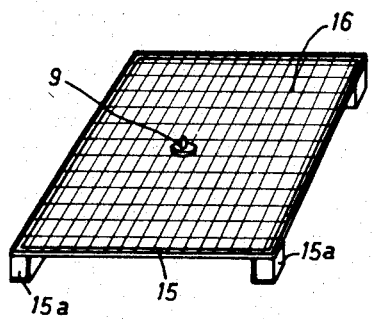
FIGS. 3, 4 and 5 show details of the arrangement.
Figure 4:
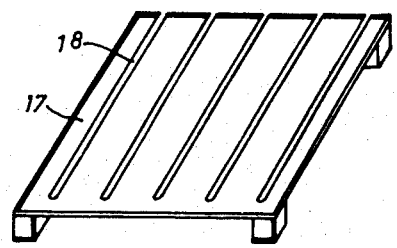
Figure 5:
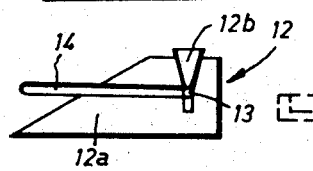

According to modifications of the arrangement, multiple receiving systems may also be secured to the conveyor strip 2, for instance as illustrated in FIGS. 3 and 4. The first type of said systems is constituted by a frame 15 resting through its feet 15a on the strip and secured to the latter by means which are not illustrated. Inside said frame 15, a network 16 is held in a tensioned condition and the meshes of said network are smaller than the largest section or collar 9a of the balance staff (FIGS. 6 to 10) so that it is possible to introduce vertically a series of such balance staffs in corresponding meshes of the network.

The multiple receiving system illustrated in FIG. 4 is constituted by a plate 17 in which a plurality of parallel slots are formed the breadth of which is also smaller than the diameter of the collars 9a on the balance staff 9, so that it is possible to insert the lower ends of a series of such balance staffs in a vertical position in each of said slots 18.

The distributing or feeding systems 8 and 10 illustrated diagrammatically as blocks contain each a box inside which the balance staffs, the balance wheels or the hairsprings are in bulk while at least one member is so provided as to give said parts a predetermined position. Said member may be a feeler in front of which the successive parts are constrained to pass and which is adapted to control an electronic circuit with a view to separate the properly positioned parts from those which are not correctly positioned. According to a modification, this separation may be obtained as well by a photo-cell illuminated by a luminous beam.

The feeding system 8 carries balance staffs and sets automatically one or more of the latter in a vertical position inside the receiving systems carried by the strip 2, taking into account the structure given to said receiving systems.

The system 10 carries selectively as desired balance staffs 21 (FIG. 6) or else hairsprings 22 (FIG. 7) and sets these elements on the balance staffs according to whether the arrangement is intended for the application of wheels or of springs.

Before the balance staffs 9 carried by the conveyor strip 2 reach the location of the feeding system 10, there is applied a small amount of glue on said balance staffs. When balance wheels 21 are to be secured, the glue is applied at points 20 (FIG. 6) of the balance staffs. In the case of the securing of hairsprings 22, the glue should be applied at 20a (FIG. 7) on the staffs 9. In this case of the securing of hairsprings, the lever 14 rocks the balance staffs 9 into a horizontal position before they reach the spring distributing system 10.

The glue may be liquid or solid according to the temperature in the premises. In the first case, the glue is applied through an atomizer or a distributing pipette. In the second case, the application of the glue is provided through pincers or a non-metallic atomizer adapted to distribute the glue in a pulverulent condition or else it is possible to resort to a small stick made of glue the end of which is applied on the corresponding sections of the balance staffs which are to be provided with said glue.

If the glue is solid when cold, the distributing system 8 carries means for heating the parts to be glued so that the glue may become liquid under the action of the heat thus stored.

The glue used may be constituted for instance by synthetic resin such as ethoxyline with which is incorporated a catalyst or a hardening agent adapted to accelerate the polymerization and to make the hardening easier.

Figure 6:
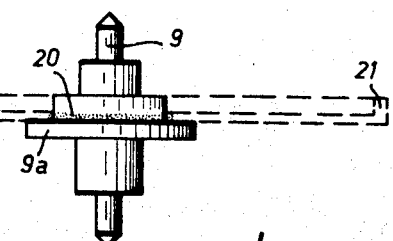
FIG. 6 shows a balance staff carrying a balance wheel glued to it.

The balance staffs provided as described with glue at 20 or 20a, are then brought through the strip 2 into registry with the distributing system 10. The latter adapted, according to the proposed use of the arrangement, to set the balance wheels 21 over the collars 9a or the hairsprings 22 on the tip of the balance staffs which are to receive them at 9b. The balance wheels must naturally be set in a manner such that the lower surfaces of their arms lie in a horizontal plane (FIG. 6). When securing a hairspring, the latter is suspended over the balance staff axis through its inner end which is to be secured to the section adapted to carry it on the balance staff.

The passage through the kiln 5 of the units thus formed, which are constituted by balance staffs carrying their balance wheels or their hairsprings, provides the hardening of the glue and consequently the final securing of the elements together. Of course, the temperature of the kiln should be adjusted in accordance with the grade of the glue used, as required by the application to be considered.

The units thus made pass, upon leaving the kiln, under the optic means 11 which are adapted to control whether the plane of a balance wheel is accurately perpendicular to the axis of the balance staff or whether the plane of a hairspring is perpendicular to the axis of the balance staff and also whether the hairspring is properly centered with reference to said axis.

When this checking is at an end, the units executed with the arrangement disclosed, are raised manually or mechanically out of the receiving system carrying them. The receiving system is then returned towards the distributing system 8 with the strip to which it is secured.

Of course and in accordance with a modification, the glue may be applied at a suitable point of the balance wheel 21 or on the inner end of the hairspring 22, which balance wheel or hairspring is to be secured to a balance staff.

According to a further modification, the glue may be applied as well on the balance staff 9 at 20 or 20a and also on the balance wheel or on the inner end of the hairspring 22.

FIG. 2 shows an arrangement which permits to obtain balance units according to FIG. 8 in a single operative step. The balance wheel 21 and the hairspring 22 are secured in succession over the balance staff 9. The arrangement according to FIG. 2 contains the name systems as the arrangement described with reference to FIG. 1. The balance staffs are removed from the feeding system 8 into the receiving system, the parts are then provided with glue in accordance with the different possible methods disclosed and then the distributing system 10 sets the balance wheels in position, the first hardening is performed in the kiln 5, the staffs provided with their wheels reach the medial section of the arrangement illustrated in FIG. 2 where heating resistances 6b are arranged under the location of the strip, said resistances providing the desired temperature through adjustment of the rheostat 7b, arranged in series therewith for instance, so that the units passing out of the kiln 5 may not cool too speedily. Said units passing out of the kiln 5 and constituted by a balance staff and its balance wheel, are arranged vertically and are rocked into a horizontal position as described to be then provided with glue after which the distributing system 10a sets, as described with reference to the distributing system 10, the hairsprings on the balance staffs already carrying their balance wheels. The units obtained enter then the kiln 5a the heating resistances of which designated by 6a are inserted for instance in series with the rheostat 7a. This leads to the final hardening which secures the hairspring to the balance staff. The units now including the staff wheel and hairspring reach the control means 11. The latter is subdivided into two parts one of which allows controlling the centering of the hairspring with reference to the balance wheel while the other is adapted to check the parallelism between the balance wheel and the hairspring and also their position with reference to the axis of the balance staff so as to detect any possible obliquity. This being done, the units are removed in the manner already disclosed out of the receiving systems and the latter reach again in their empty condition the distributing system 8. When resorting to such arrangements, the glue may again, as described hereinabove, be set together on the balance wheel and on the hairspring or else together on the balance staff, the balance wheel and the hairspring.

FIGS. 9 and 10 show a balance wheel the hairspring of which is fitted in a bearing member. The method for producing a balance with such a hairspring consists in that one end of the hairspring is introduced in its bearing member, the space separating the end of the hairspring from the bearing member being filled with glue.

In the embodiment illustrated in FIG. 9, a balance staff 9 is provided with a collar 9a and with a section 9b to which the hairspring is to be secured. The balance wheel 21 and the hairspring 22 are fitted on the section 9b of a uniform diameter which is provided at its upper end with a radial slot 23 the height of which corresponds to the breadth of the elastic blade forming the hairspring 22.

The inner end of the hairspring 22 is introduced into said slot and secured thereto, as described, through gluing. The glue may be inserted in the slot before introduction of the hairspring or it may be applied on the hairspring and be introduced with the latter or else it may be atomized simultaneously with the positioning of the hairspring in its slot, or again it is possible to fill the glue into the space remaining in the slot after the hairspring has been introduced into the latter. The amount of glue to be applied is such that it may fill said remaining space accurately and thereby ensure a proper securing of the hairspring on the balance staff.

According to the modification illustrated in FIG. 10, the hairspring is secured to the balance staff through the agency of a bearing member 24 fitted in a radial bore of the staff. Said bearing member is slotted at 25, the slot having again the breadth of the elastic blade forming the hairspring 22. The diameter of the actual bearing member 24 is somewhat larger than the height of the slot 25. A channel 26 connects the transverse surface 27 of the section 9b of the staff, adapted to receive the hairspring, with the slot 25 whereby it is possible to readily fill the latter by holding it in its desired angular position for which said slot is vertical. The insertion of the hairspring is provided in the manner described and through the means already disclosed.

In order to center the hairspring with reference to the balance staff before gluing, it is possible to resort to optical centering means such as an outline projector provided with suitable reference marks.

According to a modification which is not illustrated, the bearing member 24 may be given various other shapes, having say a rectangular, a polygonal or an elliptic cross-section, although a circular cross-section is the most commonly used since it may be formed readily at a low cost price.

What I claim is:
1. An assembly comprising in combination a balance staff, said balance staff having a collar and an enlarged portion abutting said collar, said enlarged portion having a radial bore spaced from said collar, a bearing member fitting in said bore, a slot in said bearing member; said enlarged portion having a transverse surface, a channel for connecting said surface with said slot whereby said slot can readily be filled with glue; a hairspring having an extremity in said slot and glued thereto, a balance wheel fitting around said enlarged portion and being glued to said staff at a point intermediate said collar and said hairspring.

References Cited

UNITED STATES PATENTS 228,995 6/1880 Heard _____ 58—115
3,071,365 1/1963 Henchoz _____ 58—115

ROBERT S. WARD, Jr., *Primary Examiner.*

RICHARD B. WILKINSON, *Examiner.*

M. LORCH, *Assistant Examiner.*